Patented May 5, 1953

2,637,640

UNITED STATES PATENT OFFICE 2,637,640

PLANT GROWTH REGULATION

Nathaniel Tischler, Palmyra, N. J., assignor to Sharples Chemicals Inc., a corporation of Delaware No Drawing. Application October 31, 1951, Serial No. 254,190

16 Claims. (Cl. 71—2.4)

1

This invention pertains to new and improved compositions of matter which are used for treating growing plants to alter the normal life cycle of said plants with advantageous results. It is particularly concerned with phytotoxic compositions which contain as active ingredient, that is, as plant response agent, one or more 3,6-endoxohexahydrophthalamic acids of exo-cis isomeric configuration and conforming structurally to the formula

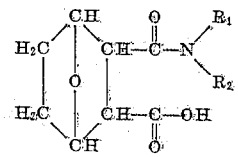

in which $R_1$ and $R_2$, taken individually, represent one of the group consisting of the hydrogen atom and alkyl, alkanol and cycloalkyl radicals, and taken collectively, represent one of the group consisting of polymethylene and oxapolymethylene radicals, as well as with compositions which when in the presence of water yield anions of such acids, e. g., salts of said acids.

The invention is concerned more particularly with the exo-cis isomeric form of the above compounds as active ingredients.

For convenience and to avoid repetition, all references made herein to active ingredients of the invention are to be construed as meaning the exo-cis form.

Phytotoxic compositions containing at least one of the aforesaid acids, per se or in chemically equivalent form, are highly effective for the purpose, and it is a feature of this invention to provide compositions containing the above active ingredients in admixture with simple, readily available materials which enhance, or intensify the plant response activity of the above active ingredients. These and other features will become apparent to persons skilled in the art as the specification proceeds.

Co-pending application Serial No. 81,026, filed March 11, 1949, by Nathaniel Tischler and Ernest P. Bell, and issued as U. S. Patent No. 2,576,080 on November 20, 1951, teaches the efficacy of the 3,6-endoxohydrophthalic acids and their derivatives in bringing about useful plant response effects such as leaf abscission (partial or complete),

2 blossom thinning, vine-kill, total destruction of the plant, or adventitious root formation, the particular plant response manifested depending to a large extent upon the applied concentration of the response agent, technique of application, and the species and degree of maturity of the plant undergoing treatment.

The preparation and use of the 3,6-endoxohexahydrophthalamic acids represented by the above formula, per se or in equivalent form, for plant response purposes is particularly described and claimed in the co-pending application of Nathaniel Tischler and Ernest P. Bell, Serial No. 254,189, filed of even date herewith. That application is a continuation-in-part of said first-mentioned application.

The above-mentioned compounds as applied to plants may be in the form of the acids per se or in chemically equivalent form, such as water-soluble salts of the acids. Any such acid and its chemically equivalent forms have the common property of yielding the same species of anions in the presence of water, and hence are considered to be equivalent for plant response purposes.

Thus the acids are the active materials, and this is so whether they are used as such or in chemically equivalent forms, such as water-soluble salts. These changes at the carboxyl groups are mere changes in form rather than changes in substance.

Among the water-soluble salts of particular interest there may be mentioned sodium, potassium, calcium, strontium, magnesium, aluminum, iron, cobalt, nickel, zinc, cadmium, mercury, copper, and ammonium salts, mono-, di-, and trialkylammonium salts, mono-, di-, and trialkanolammonium salts, mixed alkylalkanolammonium salts which are N-substituted in the ammonium radical by from 2 to 3 radicals of the type indicated, mono- and dicycloalkylammonium salts, as well as salts of heterocyclic amines such as morpholine, piperidine, pyrrolidine, and hexamethyleneimine.

Turning now the present invention, in which 3,6-endoxohexahydrophthalamic acids (per se or in equivalent form) of the kind described above are the active plant response ingredients of my new compositions, it is pointed out that said acids are appreciably soluble in water. The other forms are also water-soluble. Some of them are highly soluble, while others have a lesser degree of solubility. However, it is preferred to employ compounds having a solubility in water to the extent of at least 0.1% by weight, and still more particularly of at least 1% by weight.

Water solubility is desirable so that anions are formed when the acids, per se or in chemically equivalent form, are dissolved in water. The desirability of such anions will presently become apparent.

Thus the foregoing active ingredients may be defined as compounds which when in the presence of water yield anions of exo-cis configuration and conforming to the structure

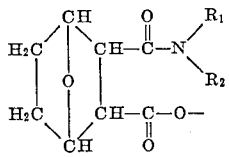

in which the meanings of $R_1$ and $R_2$ are the same as in the above formula which represents the acids.

Although the present applicant does not wish to be bound by any particular theory as to the mechanism whereby useful plant response effects are produced, a considerable amount of experimentation strongly indicates that said effects are brought about by the existence in aqueous media of anions of the type illustrated above. A salient feature of this theory is that any acid of the invention, when applied per se, or in other form, to a living plant, makes the desired anions available to the plant.

The desired anions are made available by virtue of the fact that the acids per se, and their other forms, are water-soluble and ionizable. Therefore, when such a compound is absorbed into the vascular system of a plant, it dissolves in the aqueous plant juices and provides the functioning anions. The resulting physiological activity is believed to be ascribable to the presence of such anions. The acids per se and their equivalent forms may thus be regarded as very convenient media for furnishing the desired anions to susceptible portions of the plant.

It follows, therefore, that the acids per se and their other forms are equally usable, the foregoing compounds being highly effective for the intended purpose.

I have discovered that the amount of the respective compounds used to produce a given plant response effect may be markedly reduced, or the plant response effect obtained with a given amount of active ingredient markedly increased, by admixing with any said compound or compounds, one or more of the group consisting of ammonium and substituted ammonium salts of the strong mineral acids, e. g. of sulfuric acid, hydrochloric acid, nitric acid and phosphoric acid, e. g. orthophosphoric acid; said salts being either in neutral or acid form. Particular substituted ammonium salts are the alkylammonium salts, alkanolammonium salts, and mixed alkylalkanolammonium salts.

Examples of such salts are ammonium sulfate, chloride, nitrate and phosphate; ammonium acid sulfate; ammonium dihydrogen phosphate and ammonium monohydrogen phosphate; mono-, di-, and trialkylammonium sulfates, chlorides, nitrates and phosphates, having from 1 to 4 carbon atoms in each alkyl radical; mono-, di-, and trialkylammonium acid sulfates and phosphates having from 1 to 4 carbon atoms in each alkyl radical; mono-, di-, and trialkanolammonium sulfates, chlorides, nitrates and phosphates, having from 2 to 3 carbon atoms in each alkanol radical; mono-, di-, and trialkanolammonium acid sulfates and phosphates, having from 2 to 3 carbon atoms in each alkanol radical; mixed alkylalkanolammonium sulfates, chlorides, nitrates and phosphates, which are N-substituted by from 2 to 3 radicals of the type and carbon content indicated; and mixed alkylalkanolammonium acid sulfates and phosphates which are N-substituted by from 2 to 3 radicals of the type and carbon content indicated.

As pointed out above, the sulfates and phosphates contemplated include both the acid sulfates and phosphates and the neutral sulfates and phosphates, and mixed neutral sulfates and phosphates, that is sulfates and phosphates in which the cations are different.

The preparation of the sulfates, chlorides, nitrates and phosphates may be accomplished by any means known to the art, and suitable methods will be found in the literature.

Preparation of the 3,6-endoxohexahydropthalamic acids may readily be accomplished by reacting exo-cis-3,6-endoxohexahydropthalic anhydride with ammonia or a primary or secondary amine, reaction proceeding in accordance with the equation:

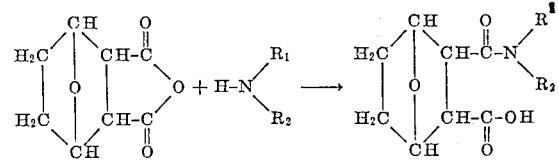

wherein $R_1$ and $R_2$ have the same meanings as in the formulas given above for the acids and the anions derivable therefrom.

Examples of primary and secondary amines which may be reacted with the above anhydride to yield the corresponding N-substituted 3,6-endoxohexahydropthalamic acid are methlamine, ethylamine, propylamine, butylamine, amylamine, hexylamine, heptylamine, octylamine, nonylamine, decylamine, undecylamine, dodecylamine, dimethylamine, diethylamine, dipropylamine, dibutylamine, diamylamine, dihexylamine, methylethylamine, ethylpropylamine, propylbutylamine, butylamylamine, amylhexylamine, methylundecylamine, cyclopropylamine, cyclobutylamine, cyclopentylamine, cyclohexylamine, dicyclopropylamine, dicyclobutylamine, dicyclopentylamine, dicyclohexylamine, cyclopropylamylamine, cyclopropylhexylamine, cyclobutylmethylamine, cyclobutylbutylamine, cyclopentylmethylamine, cyclopentylheptylamine, cyclohexylmethylamine, cyclohexylethylamine, cyclohexylpropylamine, cyclohexylhexylamine, monoethanolamine, monopropranolamine, diethanolamine, dipropanolamine, ethanolpropanolamine, methylethanolamine, propylpropanolamine, nonylpropanolamine, amylethanolamine, decylethanolamine, ethylethanolamine, cyclohexylethanolamine, cyclohexylpropanolamine, pyrrolidine, piperidine, hexamethyleneimine, and morpholine.

Theoretically, if a free acid is desired the anhydride and ammonia or amine as shown in the foregoing equation are brought together, conveniently in equimolar proportions, and mixed, such as by stirring, until reaction has taken place. The reaction may be conducted in aqueous or no-aqueous media, the latter being frequently preferred. Suitable non-aqueous media are those which are substantially inert toward the reactants and products, such as hexane, kerosene, benzene, toluene, xylene, etc. However, if a salt is obtained instead of a free acid, the latter may be obtained by treatment of the salt (e. g., in water solution) with a suitable inorganic acid such as hydrochloric acid or sulfuric acid.

Reaction occurs readily at ordinary temperature in many instances, while in others it is helpful to employ somewhat elevated temperatures, such as up to say 100° C., in order to speed the reaction. Temperatures appreciably greater than 100° C. are less preferred, because of the tendency of some of the products to decompose under such conditions.

A useful modification of the above procedure consists in employing two moles or more of ammonia or amine per mole of the anhydride, a salt being ordinarily obtained, particularly if the free acid as formed remains in solution. One mole of ammonia or amine serves to react with the anhydride to form the corresponding amide-acid as shown in the above equation, and a second mole of ammonia or amine serves to neutralize the acid so formed.

Salts may be obtained by preparing the appropriate free acid as described above, followed by neutralizing the acid with the same or a different amine. On the other hand, the free acid may be neutralized with an inorganic base. In many instances it is very convenient to omit isolation of the acid, carrying out the neutralization in the reaction mixture in which the acid was prepared. In other instances it may be desired to isolate the acid, and neutralize it in a separate step.

Preferred alkyl radicals for attachment to the amide nitrogen atom of the acids are those having from 1 to 12 carbon atoms, such as methyl, ethyl, propyl, butyl, amyl, hexyl, heptyl, octyl, nonyl, decyl, undecyl, and dodecyl. Preferred alkanol radicals for attachment to said amide nitrogen atom are those having from 2 to 3 carbon atoms, such as ethanol and propanol. Preferred cycloalkyl radicals for attachment to said amide nitrogen atom are those having from 3 to 6 carbon atoms, such as cyclopropyl, cyclobutyl, cyclopentyl, and cyclohexyl. Examples of polymethylene and oxapolymethylene radicals suitable for attachment to said amide nitrogen atom are tetramethylene, pentamethylene, hexamethylene, and 3-oxapentamethylene radicals. The totality of carbon atoms in such radical or radicals as may be attached to the amide nitrogen atom is preferably not more than 12.

Examples of acids of the invention are the parent acid, namely, 3,6 - endoxohexahydrophthalamic acid, and N-substituted acids as follows: N-methyl-, N-ethyl-, N-propyl-, N-butyl-, N-amyl-, N-hexyl-, N-heptyl-, N-octyl-, N-nonyl-, N-decyl-, N-undecyl-, N-dodecyl-, N,N-dimethyl-, N,N-diethyl-, N,N-dipropyl-, N,N-dibutyl-, N,N-diamyl-, N,N-dihexyl-, N-ethyl-N-methyl-, N-amyl-N-methyl-, N-methyl-N-octyl-, N-methyl-N-undecyl-, N-butyl-N-ethyl-, N-hexyl-N-propyl-, N-amyl-N-hexyl-, N-cyclopropyl-, N-cyclobutyl-, N - cyclopentyl-, N - cyclohexyl-, N,N-dicyclopropyl-, N,N-dicyclobutyl-, N,N-dicyclopentyl-, N,N-dicyclohexyl-, N-amyl-N-cyclopropyl-, N-cyclopropyl-N-hexyl-, N-cyclobutyl-N-methyl-, N-butyl-N-cyclobutyl-, N-cyclopentyl-N-methyl-, N-cyclopentyl-N-heptyl-, N-cyclohexyl-N-methyl-, N-cyclohexyl-N-ethyl-, N-cyclohexyl-N-propyl-, N-cyclohexyl-N-hexyl-, N-ethanol, N-propanol, N,N-diethanol, N,N-dipropanol, N-ethanol-N-propanol, N-methyl-N-ethanol, N-ethyl-N-ethanol, N-propyl-N-propanol, N-nonyl-N-propanol, N-amyl-N-ethanol, N-decyl-N-ethanol, N-cyclohexyl-N-ethanol, N-cyclohexyl-N-propanol, N-tetramethylene-, N-pentamethylene-, N-hexamethylene-, and N-3-oxapentamethylene-3,6-endoxohexahydrophthalamic acids.

The amount of additive or "intensifier" to be admixed with the active ingredient may vary over a very wide range. A small amount will produce a useful intensifying effect, and since some of the intensifiers employed in this invention are also good fertilizers, especially in the case of ammonium sulfate, ammonium nitrate, and diammonium hydrogen phosphate, I contemplate the use of proportions of intensifier far in excess of those proportions producing optimum intensifying action.

For practicable purposes, proportions of intensifier to active ingredient of from 1:10 to 20:1, and particularly from 1:2 to 5:1 are very useful when the primary purpose of the application of the admixture is the enhancement of phytotoxic effect. On the other hand, when substantial fertilization of soil is also desired, the proportion of intensifier to active ingredient may run quite high, such as up to 100:1, or even more.

The intensifier and the active ingredient may be admixed in any desired manner such as by mere mechanical mixing in solid form, or while in solution in a common solvent such as water. In the latter case the solution may be marketed as such, or if desired, may be dried at temperatures sufficiently low to prevent decomposition of the active ingredient, such as up to say 100° C. In any case, it is preferred to have a solid admixture in finely divided form and sufficiently dry to be free flowing.

The admixtures are applied to the crop or plants in any desired manner, such as in the form of a solid, for example, by dusting, or in the form of a liquid, for example, by spraying.

Compositions may be formulated by mixing the admixture containing the intensifier and active ingredient with any desired liquid or solid carriers, such as any of the finely divided solid carriers known in the dusting art, which are preferably of large surface area, such as clay, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer Clay, Celite, and Tripoli may be mentioned as typical.

Non-clay carriers which may be formulated with my admixture include, for example, sulfur, volcanic ash, calcium carbonate, lime, by-product lignin, lignocellulose, flour, such as wood, walnut shell, wheat, soybean, potato, cottonseed, etc.

Any desired mixture may be prepared by any suitable method. Thus, if a solid, the active ingredient may be ground to a fine powder and tumbled together with the intensifier, or the intensifier and the active ingredient may be ground together; alternatively, the active ingredient in liquid form, including solutions, dispersions, emulsions, and suspensions thereof, may be admixed with the intensifier in finely divided form in amounts small enough to preserve the free-flowing property of the final dust composition. Or excess liquid may be removed, such as by vaporization, for example, under reduced pressure. The same applies to mixtures of the active ingredient, the intensifier, and any finely divided solid carrier and/or other material.

When solid compositions are employed, in order to obtain a high degree of plant coverage with minimum poundage per acre, it is desirable that the composition be in finely divided form. Preferably, the dust containing the active ingredient should be sufficiently fine that substantially all will pass through a 50 mesh sieve, and more particularly through a 200 mesh sieve. Excellent results have been obtained in which the dust composition is comprised predominantly of particles in the range from 15 to 45 microns. Finer dusts, such as those consisting largely of particles in the range of 5 microns and below have excellent covering capacity but are somewhat more subject to drift and are more expensive to prepare.

For spray application the admixture may be dissolved or dispersed in a liquid carrier such as water or other suitable liquid.

Aqueous solutions or dispersions are economical and desirable. In general, the choice of the particular liquid carrier employed will be guided somewhat by prevailing circumstances, such as its availability, its solubility or dispersion characteristics toward the particular admixture employed, and/or its toxicity toward the plants undergoing treatment. In general, water is an excellent liquid carrier.

Thus, spray formulations comprising the active ingredient in the form of a solution, suspension, dispersion, or emulsion, in aqueous or non-aqueous media may be employed.

Emulsions or dispersions of the admixture in the liquid carrier may be prepared by agitation of the admixture with the carrier. This is commonly done at the time of spraying. Preferably, however, the agitation should take place in the presence of an emulsifying or dispersing agent (surface-active agent), in order to facilitate the preparation of said emulsion or dispersion. Emulsifying and dispersing agents are well known in the art, and include, for example, fatty alcohol sulfates, such as sodium lauryl sulfate, aliphatic or aromatic sulfonates, such as sulfonated castor oil or the various alkaryl sulfonates (such as the sodium salt of monosulfonated nonyl naphthalene or tertiary dodecyl benzene), and non-ionic types of emulsifying and dispersing agents such as the high molecular weight alkyl polyglycolethers or analogous thioethers such as the decyl, dodecyl and tetradecyl polyglycolethers and thioethers containing from 25 to 75 carbon atoms.

The use, if desired, of adjuvants, such as wetting agents and/or humectants, is also contemplated in connection with solutions of the admixture, such as water solutions. Any suitable wetting agent and/or humectant may be employed for this purpose, such as the wetting agents more particularly referred to above. Examples of humectants are glycerine, diethylene glycol, ethylene glycol, polyethylene glycols generally, and water-soluble sugars and sugar-containing mixtures, such as glucose, fructose, galactose, mannose, arabinose, xylose, sucrose, maltose, lactose, raffinose, trehalose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent after spraying upon the plant.

It should be considered that once the solution has been sprayed upon the plant, the concentration of wetting agent existing upon the plant is in no sense a function of the concentration existing in the original spray solution. Thus, evaporation might concentrate the wetting agent considerably, or the presence of dew on the plant surfaces, or of plant juices on the plant surfaces might considerably dilute this agent.

It will, of course, be understood that wetting agents, particularly when in solid form, may be compounded with the admixture when in solid form.

Although the admixture of active ingredient and intensifier may be applied to the growing plant in concentrated form, it is usually desirable to employ liquid or solid formulations, for example, as discussed above, in which the active ingredient constitutes less than 30% by weight of the total, such as less than 10% and even as low as 0.1%. When it is intended that the intensifier shall also have a substantial effect as a fertilizer, it may, of course, be present in very substantial quantity with or without the presence of a solid or liquid carrier.

Other substances than the carrier and/or surface active agent may be included in solid or liquid formulations if desired. Thus, active ingredients other than those disclosed herein and compatible with the admixture may be added if desired for any particular purpose. Also substances may be added to bring about various physical improvements such as the prevention of lumping during storage, or improvement with respect to coverage, moisture adsorption, adherence, etc. Such other active ingredients may be included in said formulations to accomplish various physiological effects. For example, it may at times be expedient to include singly or in combination, substances such as fungicides, insecticides, bactericides, or types of plant response agents other than those agents discussed herein.

In practice of the process as applied to defoliation, the rate of application (i. e. the amount of admixture per crop unit) for best results will depend among other factors upon the species of plants being treated and upon their maturity. In any event, the amount of active ingredient employed for the same plant response effect will be substantially lower than when the intensifier is not present.

As a rule the more mature the plant at the time of application, the less active material is required. In practice, the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the defoliant initially at a relatively low rate, and to follow with a second application if necessary after observation of the first effects, to obtain the degree of defoliation desired.

Use of dosages greatly in excess of the minimum required for good defoliation may result in shock to the plant with attendant injury to the remainder of the plant.

In fact, the plant response agents of the present invention are effective herbicides when used in amounts substantially greater than those required for defoliation, and they may be used advantageously for the killing of plants or vines (as in the case of potatoes) when desired, such as, for the killing of undesired plants, for example, weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents, in addition to the use of an intensifier.

I am aware of the fact that it has been proposed to use certain ammonium salts, such as ammonium sulfate, in combination with phenolic substances, such as dinitroalkylphenols and pentachlorophenol, for plant response purposes. The purpose of such use of ammonium salts as explained by Crafts and Reiber, Hilgardia, volume 16, pages 487–499, and by Crafts, Science, volume 108, pages 85–86, is to make available the free phenol at the plant surface from an aqueous solution of a water-soluble salt of said phenol. The phenol in such cases is the active plant response substance and is continuously regenerated at the plant surface from its water-soluble salt by virtue of the presence of the ammonium salt. As the free phenol is absorbed by the plant surface, further free phenol is generated under equilibrium conditions. The plant response effect of the free phenol is not enhanced or intensified by such procedure, or in other words, is substantially the same as that obtained by the application directly to the plant of a similar quantity of free phenol. In view of the insolubility of the phenol in water, this procedure is adopted in order to make available the use of water as a vehicle for applying the plant response agent, i. e. herbicide, to the plant surfaces.

In the case of my invention, on the other hand, the plant response effect obtained from a given quantity of active ingredient is greater than that obtained by the application of the same quantity of the particular active ingredient to the plant in the absence of my intensifier. In fact, the plant response effect obtained with the same quantity of active ingredient may be increased many times by the addition of larger quantities of my intensifier. The intensification begins to manifest itself by the addition of a small proportion of my intensifier and increases to a point of optimum intensification by the addition of increasing proportions of intensifier. For optimum plant response effects, the proportion of intensifier to active ingredient may vary somewhat between specific active ingredients and between specific varieties of plants undergoing treatment, so that the exact proportion for optimum effect under all conditions cannot be given. However, the intensification of the plant response effect is present when a small quantity of intensifier is added, and the addition of intensifier beyond the point at which no further marked increase in intensification is obtained does no harm, and may have a very useful purpose, such as when the intensifier is also a fertilizer.

The exact mechanism by which the intensification of the active ingredient is obtained in the practice of my invention is not known. However, such intensification is cogently demonstrated by the following examples which are by way of illustration and not of limitation, it being understood that any other intensifier of the invention may be substituted for the ammonium sulfate employed therein.

In each example below, a group of plants was not treated and was kept as a control, the untreated group being similar to the treated group or groups. All plants (both treated and untreated) used for a test were of the same age and had been grown at the same time and under the same conditions. After the test was commenced, treated plants and untreated controls were again kept under the same conditions and therefore were subjected to comparable growing conditions. In all instances, the untreated controls grew normally.

EXAMPLE 1

Aqueous solutions of sodium N,N-diethyl-3,6-endoxohexahydrophthalamate of the following respective concentrations were spray-misted by means of a small DeVilbiss atomizer onto individual groups of thirty-two potted Dwarf Horticultural bean plants: 0.016%, 0.031%, 0.062%, 0.125%, and 0.25%. The plants were at a stage of growth at which the first trifoliate leaf was still furled.

Each group of thirty-two plants was arranged uniformly in a 2 foot by 3 foot area, and 3 ml. of test solution was uniformly sprayed in the described manner onto the area. This rate of application corresponds to approximately 6 gallons per acre; this low volume rate simulates practical conditions of aeroplane spraying. Thus the amount of active ingredient was 0.125, 0.25, 0.5, 1.0, and 2.0 ounces, respectively, per acre.

A parallel series of tests was carried out in which the aqueous solutions of the above concentrations of the active ingredient also contained ammonium sulfate as an intensifier, the weight ratio of intensifier to active ingredient being 5:1 in all cases. Thus the amount of ammonium sulfate was 0.625, 1.25, 2.5, 5.0, and 10.0 ounces, respectively, per acre.

Observations made three days after the plants were treated are given in Table 1.

Several symbols are employed in this table, their meanings being as follows in this example and wherever applicable in the other examples:

lt=light or lightly
mod=moderate or moderately
sev=severe or severely
bn=burned
ret=retarded
adh=adhering
C=untreated control
PL=primary leaves
TS=trifoliate shoots 6S, for example, means each of six plants had a single primary leaf abscised; 2B, for example, means each of two plants had both primary leaves abscised.

*Table 1*

| Conc. of active ingredient, ounces per acre | Physiological effects | |
|---|---|---|
| | Without $(NH_4)_2SO_4$ | With $(NH_4)_2SO_4$ |
| 0.125 | As C | 1S; adh PL—lt bn. |
| 0.25 | ----do---- | 2B, 6S; adh PL—lt to mod bn. |
| 0.5 | PL—lt bn; otherwise as C | 5B, 1S; adh PL—mod bn. |
| 1.0 | 2B, 3S; adh PL—lt bn | 19B, 1S; adh PL—mod bn. |
| 2.0 | 6B, 7S; adh PL—mod bn | 17B, 1S; adh PL—sev bn. |

Control tests using the intensifier in the absence of active ingredient were conducted. Groups of plants wholly analogous to the above groups were treated with ammonium sulfate solutions of various concentrations, using the above-described method of application. Even at a dosage of 5 pounds of ammonium sulfate per acre, the plants were not affected. Similar control tests were carried out in the other examples and in no case were the plants affected by the intensifier.

Thus it is seen that the above active ingredient is highly phytotoxic per se, even when employed in quite low dosage, and that its phytotoxic properties are markedly enhanced, or intensified, by admixing the active ingredient with an intensifier of this invention.

EXAMPLE 2

Compounds employed in this test were as follows, the capital letters identifying the compounds in Table 2 below:

Aqueous solutions having the following concentrations of these respective active ingredients were prepared: 0.0006%, 0.00125%, 0.0025%, 0.005%, and 0.0075%.

Other aqueous solutions were prepared having the same concentrations of the same active ingredients as indicated in the preceding paragraph; in addition, each solution contained 0.05% of ammonium sulfate. Thus the weight ratio of intensifier to active ingredient ranged from 6.7:1 to 83.3:1.

These solutions were applied to potted young Dwarf Horticultural bean plants at a growth stage at which some of the first trifoliate leaves were still furled and others were unfurling. Separate groups of eight such plants were dipped to the first nodes into the respective test solutions, and the excess solution was shaken off. Approximately 2 ml. of solution remained on each plant. Thus the dosage per plant of active ingredient, depending on the concentrations of the test solutions, was approximately 12, 25, 50, 100, and 150 micrograms, respectively. The dosage per plant of intensifier was constant, amounting to approximately 1000 micrograms.

Observations were made three days after treatment and are summarized in Table 2.

*Table 2*

PHYSIOLOGICAL EFFECTS

| Compound | Active ingredient per plant | | | | |
|---|---|---|---|---|---|
| | 12 micrograms | 25 micrograms | 50 micrograms | 100 micrograms | 150 micrograms |
| A alone | 4S; adh PL—some lt bn, some as C. | 2B, 3S; adh PL—mod bn. | 5B, 3S; adh PL—mod bn. | 5B; adh PL—frozen. | 4B, 2S; adh PL—frozen. |
| A with $(NH_4)_2SO_4$ | 1B; adh PL—lt bn | 7B, 1S; adh PL—sev bn. | 4B, 2S; adh PL—sev bn, partly shrivelled. | 4B, 2S; adh PL—shrivelled and frozen. | 3B, 4S; adh PL—shrivelled and frozen. |
| B alone | 2S; adh PL—lt bn | PL—lt bn | 3B, 2S; adh PL—mod bn. | 8B | 7B; adh PL—shrivelled and frozen. |
| B with $(NH_4)_2SO_4$ | 1B; adh PL—mod bn. | 6B, 2S; adh PL—shrivelled and frozen. | 7B; adh PL—shrivelled and frozen. | 5B, 1S; adh PL—shrivelled frozen. | 5B; adh PL—shrivelled and frozen. |
| C alone | As C | As C | 3S; adh PL—lt bn. | 3B, 1S; adh PL—mod bn. | 5B; adh PL—sev bn. |
| C with $(NH_4)_2SO_4$ | PL—lt bn | 6B; adh PL—mod bn. | 6B, 1S; adh PL—Lsev bn. | 6B, 2S; adh PL—shrivelled and frozen. | 4B, 2S; adh PL—shrivelled and frozen. |

The term "frozen" as used to describe a condition of the leaves of a plant treated with a defoliant denotes that condition in which the leaves have undergone such a quick and drastic response that no abscission layer has formed. The leaves then cling tenaciously to the plant although the leaf blade and petiole are dead and shrivelled, and show no tendency to abscise. Thus, it is to be understood that "freezing" or "shrivelling" of leaves indicates a more phytotoxic condition when the leaves actually abscise.

A. Diethylammonium N,N-diethyl-3,6-endoxohexahydrophthalamate.
B. Dibutylammonium N,N-dibutyl-3,6-endoxohexahydrophthalamate.
C. N - butyl - 3,6 - endoxohexahydrophthalamic acid.

EXAMPLE 3

The following compounds were employed in this test:

A. Diethylammonium N,N-diethyl-3,6-endoxohexahydrophthalamate.
B. Dibutylammonium N,N-dibutyl-3,6-endoxohexahydrophthalamate.

C. N-butyl-3,6-endoxohexahydrophthalamic acid.

D. N,N-diisopropyl-3,6-endoxohexahydrophthalamic acid.

The capital letters are used to designate these compounds in Table 3 below.

Aqueous solutions having the following respective concentrations of these respective active ingredients were spray-misted by means of a small DeVilbiss atomizer onto individual groups of eight potted Dwarf Horticultural bean plants (with the first trifoliate leaf still furled): 0.016%, 0.031%, 0.062%, 0.125%, 0.25%, and 0.5%. Each test solution contained ammonium sulfate in a 5:1 weight ratio of intensifier to active ingredient.

Each group of plants was arranged uniformly in a 2 foot by 3 foot area, and 3 ml. of test solution was sprayed thereon as described above; this rate of application corresponds to approximately 6 gallons per acre. Thus the amount of active ingredient per acre was 0.125, 0.25, 0.5, 1.0, 2.0, and 4.0 ounces, respectively; the amount of ammonium sulfate was five times as much as that of the active ingredient, in each instance.

Table 3 summarizes observations made four days after treatment.

also acid salts in cases where such exist) of the strong mineral acids mentioned herein, such as monoalkylammonium, dialkylammonium, or trialkylammonium salts, preferably have from 1 to 4 carbon atoms in each alkyl radical. The alkanolammonium salts such as monoalkanolammonium, dialkanolammonium, or trialkanolammonium preferably have from 2 to 3 carbon atoms in each alkanol radical. The mixed alkyl-alkanolammonium salts such as monoalkyl monoalkanolammonium, dialkyl monoalkanolammonium, or monoalkyl dialkanolammonium preferably have from 1 to 4 carbon atoms in each alkyl radical and from 2 to 3 carbon atoms in each alkanol radical.

The following examples apply to both the active ingredient and the intensifier.

Examples of monoalkylammonium salts are the monomethylammonium, monoethylammonium, monopropylammonium, monobutylammonium, monoamylammonium, monohexylammonium, monoheptylammonium, monooctylammonium, mononylammonium, monodecylammonium, monoundecylammonium, monododecylammonium and similar monoalkylammonium salts of such acids.

Examples of dialkylammonium salts are the dimethylammonium, diethylammonium, dipro-

Table 3

PHYSIOLOGICAL EFFECTS

| Compound | Active ingredient per acre | | | | | |
|---|---|---|---|---|---|---|
| | 0.125 ounce | 0.25 ounce | 0.5 ounce | 1.0 ounce | 2.0 ounces | 4.0 ounces |
| A | As C | 1S; adh PL—lt bn; TS—as C. | 5B, 3S; adh PL—mod bn; TS—mod ret. | 5B, 3S; adh PL—frozen; TS—mod ret. | 6B, 2S; adh PL—frozen; TS—sev ret. | 6B, 1S; adh PL—frozen; TS—sev ret. |
| B | do | 2S; adh PL—mod bn; TS—as C. | 7B, 2S; adh PL—frozen; TS—mod ret. | 5B, 1S; adh PL—frozen; TS—sev ret. | 5B, 1S; adh PL—frozen; TS—sev ret. | 3B, 2S; adh PL—frozen; TS—sev ret. |
| C | do | 1B, 3S; adh PL—mod bn; TS—lt ret. | 7B, 2S; adh PL—frozen; TS—mod ret. | 5B; adh PL—frozen; TS—mod ret. | 5B, 3S; adh PL—frozen; TS—sev ret. | 2B, 2S; adh PL—frozen; TS—sev ret. |
| D | 1B; adh PL—lt bn; TS—as C. | 6B; adh PL—some bn, some shrivelled; TS—mod ret. | 5B, 2S; adh PL—frozen; TS—mod ret. | 6B, 1S; adh PL—frozen; TS—mod ret. | 5B, 2S; adh PL—frozen; TS—sev ret. | 6B; adh PL—frozen; TS—sev ret. |

Phytotoxic effects are less pronounced when no intensifier is used.

When the active ingredients are used in the form of the acids per se, aqueous solutions containing such acids probably contain non-ionized acid in equilibrium with ionized material.

The alkylammonium salts of 3,6-endoxohexahydrophthalamic acids, such as monoalkylammonium, dialkylammonium, or trialkylammonium salts preferably have from 1 to 12 carbon atoms in each alkyl radical, the totality of carbon atoms preferably being not more than 12. The alkanolammonium salts such as monoalkanolammonium, dialkanolammonium, or trialkanolammonium preferably have from 2 to 3 carbon atoms in each alkanol radical. The mixed alkyl-alkanolammonium salts such as monoalkyl monoalkanolammonium, dialkyl monoalkanolammonium, or monoalkyl dialkanolammonium preferably have from 1 to 4 carbon atoms in each alkyl radical and from 2 to 3 carbon atoms in each alkanol radical. The cycloalkylammonium salts such as monocycloalkylammonium and dicycloalkylammonium preferably have from 3 to 6 carbon atoms in each cycloalkyl radical, the totality of carbon atoms preferably being not more than 12.

The alkylammonium salts (neutral salts, and pylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of such acids.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of such acids.

Examples of monoalkanolammonium salts are the monoethanolammonium, monopropanolammonium, and similar salts of such acids.

Examples of dialkanolammonium salts are the diethanolammonium, dipropylammonium, ethanolammonium, dipropanolammonium, ethanolpropanolammonium and similar salts of such acids.

Examples of trialkanolammonium salts are the triethanolammonium, tripropanolammonium, ethanoldipropanolammonium, propanoldiethanolammonium and similar salts of such acids.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of such acids.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of such acids.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of such acids.

The following examples apply more particularly to the active ingredients.

Examples of monocycloalkylammonium salts are the cyclopropylammonium, cyclobutylammonium, cyclopentylammonium, cyclohexylammonium, and similar monocycloalkylammonium salts of such acids.

Examples of dicycloalkylammonium salts are the dicyclopropylammonium, dicyclobutylammonium, dicyclopentylammonium, dicyclohexylammonium, cyclopropylcyclohexylammonium, and similar dicycloalkylammonium salts of such acids.

Other substituted ammonium salts contemplated by the invention are those in which the ammonium radical is substituted by different radicals of the kind described above, such as the cyclohexyl-methylammonium, cyclohexylethylammonium, cyclohexyl-hexylammonium, cyclopropyl-methylammonium, cyclopentyl-butylammonium, methyl-cyclohexyl-ethanolammonium, cyclohexyl-propanolammonium, and cyclohexyl-diethanolammonium salts of such acids.

As pointed out above the intensifiers contemplated include both the acid salts and the neutral salts, and mixed neutral salts, that is salts in which the cations are different.

The term plant as used herein is understood to include all portions of the plant, such as the roots, stems, leaves, blossoms, seeds, and fruits.

Among the plants which defoliate naturally and which may be defoliated by the use of this invention, are for example, cotton, potatoes, tomatoes, and beans such as soybeans and lima beans.

Among the noxious weeds against which my compositions may be used as herbicides are the following: bindweed, chickweed, cocklebur, mare's tail, shepherd's-purse, broad-leaved plantain, wild lettuce, ragweed, spurge, dock, and wild carrot.

As pointed out above, certain of the intensifiers referred to herein are well-known soil fertilizers, such as ammonium sulfate, ammonium nitrate, and diammonium hydrogen phosphate. It follows that the active ingredients in amounts sufficient to cause the desired plant response action may be compounded with such fertilizer and applied simultaneously therewith. This is particularly applicable to pre-emergence or pre-planting practices for the control of weeds, to post-emergence treatment for fertilizing purposes and control of weeds as to such useful crops to which the active ingredients evidence only slight or no herbicidal action, such for example as onions, sugar beets, flax, carrots, and cole crops, and otherwise following agricultural practices. The proportion of intensifier to active ingredient in such cases may be as desired, dependent largely upon the amount of fertilizer to be applied per acre, so as to obtain the desired coverage of active ingredient in admixture with the fertilizer. For example, the proportion of intensifier to active ingredient may range from 1000:1 or 500:1 to 100:1 or 200:1.

From the foregoing it can be seen that the endoxo compounds used in the practice of this invention, whether used as the acids or in some other form, are highly effective in regulating the growth characteristics of viable or living plants, and particularly of plants having vascular systems, when used in admixture with my intensifier. For example, the admixture may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of novelty reside in the invention.

This application is a continuation-in-part of my copending application Serial No. 161,255, filed May 10, 1950 and issued as U. S. Patent No. 2,576,083 on November 20, 1951.

I claim:

1. A plant response composition comprising a salt of a strong mineral acid with at least one of the group consisting of ammonia, alkyl amines, alkanol amines, and mixed alkylalkanol amines, and at least one water-soluble compound the anion portion of which is of exo-cis configuration and conforms to the structure

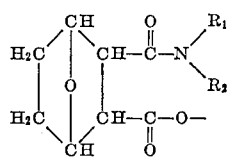

in which R$_1$ and R$_2$ taken individually represent one of the group consisting of the hydrogen atom and alkyl, alkanol, and cycloalkyl radicals, and taken collectively represent one of the group consisting of polymethylene and oxapolymethylene radicals.

2. The composition of claim 1 in which said salt is an ammonium sulfate.

3. The composition of claim 2 in which said salt is ammonium sulfate.

4. The composition of claim 3 containing a wetting agent.

5. A plant response and soil treating composition comprising a major proportion of a soil fertilizing ammonium salt of a strong mineral acid, and a minor but sufficient proportion for plant response effect of at least one water-soluble salt the anion portion of which is of exo-cis configuration and conforms to the structure

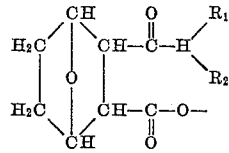

in which $R_1$ and $R_2$ taken individually represent one of the group consisting of the hydrogen atom and alkyl, alkanol, and cycloalkyl radicals, and taken collectively represent one of the group consisting of polymethylene and oxapolymethylene radicals.

6. A plant response composition comprising a salt of a strong mineral acid with at least one of the group consisting of ammonia, alkyl amines, alkanol amines and mixed alkylalkanol amines, and at least one compound which when in the presence of water yields anions of exo-cis configuration and conforming to the structure

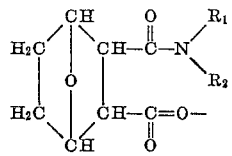

in which $R_1$ and $R_2$ taken individually represent one of the group consisting of the hydrogen atom and alkyl, alkanol, and cycloalkyl radicals, and taken collectively represent one of the group consisting of polymethylene and oxapolymethylene radicals.

7. A plant response and soil treating composition comprising a major proportion of a soil fertilizing ammonium salt of a strong mineral acid, and a minor but sufficient proportion for plant response effect of at least one compound which when in the presence of water yields anions of exo-cis configuration and conforming to the structure

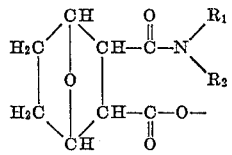

in which $R_1$ and $R_2$ taken individually represent one of the group consisting of the hydrogen atom and alkyl, alkanol, and cycloalkyl radicals, and taken collectively represent one of the group consisting of polymethylene and oxapolymethylene radicals.

8. A method for inducing plant response in a living plant, comprising applying to said plant a composition comprising a salt of a strong mineral acid with at least one of the group consisting of ammonia, alkyl amines, alkanol amines and mixed alkylalkanol amines, and at least one water-soluble compound the anion portion of which is of exo-cis configuration and conforms to the structure

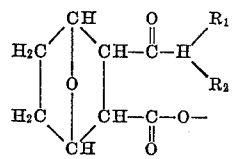

in which $R_1$ and $R_2$ taken individually represent one of the group consisting of the hydrogen atom and alkyl, alkanol, and cycloalkyl radicals, and taken collectively represent one of the group consisting of polymethylene and oxapolymethylene radicals.

9. The method of claim 8 in which said salt is an ammonium sulfate.

10. The method of claim 9 in which said salt is ammonium sulfate.

11. A method for regulating the growth characteristics of a plant, comprising applying to said plant a plant response composition comprising a salt of a strong mineral acid with at least one of the group consisting of ammonia, alkyl amines, alkanol amines and mixed alkylalkanol amines, and at least one compound which when in the presence of water yields anions of exo-cis configuration and conforming to the structure

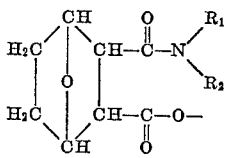

in which $R_1$ and $R_2$ taken individually represent one of the group consisting of the hydrogen atom and alkyl, alkanol, and cycloalkyl radicals, and taken colectively represent one of the group consisting of polymethylene and oxapolymethylene radicals.

12. A plant response composition comprising ammonium sulfate and exo-cis diethylammonium N,N-diethyl-3,6-endoxohexahydrophthalamate.

13. A plant response composition comprising ammonium sulfate and exo-cis dibutylammonium, N,N - dibutyl - 3,6 - endoxohexahydrophthalamate.

14. A plant response composition comprising ammonium sulfate and exo-cis sodium, N,N-diethyl-3,6-endoxohexahydrophthalamate.

15. A plant response composition comprising ammonium sulfate and exo-cis N-butyl-3,6-endoxohexahydrophthalamic acid.

16. A plant response composition comprising ammonium sulfate and exo-cis N,N-diisopropyl-3,6-endoxohexahydrophthalamic acid.

NATHANIEL TISCHLER.

No references cited.